United States Patent [19]

Caprio et al.

[11] 3,852,807

[45] Dec. 3, 1974

[54] AUTOMATIC HUE CONTROL CIRCUIT

[75] Inventors: Gerald L. Caprio, Des Plaines; Norman W. Parker, Wheaton, both of Ill.

[73] Assignee: Motorola, Inc., Franklin Park, Ill.

[22] Filed: Sept. 24, 1973

[21] Appl. No.: 399,701

Related U.S. Application Data

[63] Continuation of Ser. No. 248,164, April 27, 1972, abandoned.

[52] U.S. Cl. .................................................. 358/28

[51] Int. Cl. .............................................. H04n 9/12

[58] Field of Search .................. 178/5.4 HE; 358/28

[56] References Cited

UNITED STATES PATENTS 3,647,941 3/1972 Andrade et al. ............... 178/5.4 HE 3,668,306 6/1972 Hansen ......................... 178/5.4 HE

*Primary Examiner*—Richard Murray

*Attorney, Agent, or Firm*—Aichele & Ptak Mueller

[57] ABSTRACT

An automatic hue control circuit for a color television receiver operates to improve the flesh tones produced by the receiver by causing signals lying near the +I axis to be shifted to the +I axis if they fall within a predetermined angle on either side of the +I axis. This is accomplished with little or no effect on hues lying outside of the angle about the +I axis in which the correction occurs, so that correction is confined to the area about the +I axis where it is desired.

This is accomplished by splitting the chroma signal into its I and Q constituent parts either at base-band or subcarrier frequencies and comparing the value of a predetermined fraction of +I components with the absolute value of Q voltage components ($|E_Q|$) to control the operation of a gating circuit to prevent the passage of Q signals if the value of the +I component is greater than $|E_Q|$ and to permit the passage of signal components if $|E_Q|$ is greater than the fractional value of the +I components. The output of this gate then is combined with the I signal components to provide a reconstituted or reconstructed color signal which then is used to form the red, blue and green signals necessary to drive the cathode ray tube. The Q signal components are blocked only for signals within the angle determined by the fraction of the +I component which is compared with $|E_Q|$. For signals lying outside of this angle, no modification of the color signals takes place.

13 Claims, 10 Drawing Figures

AUTOMATIC HUE CONTROL CIRCUIT

This is a continuation of application Ser. No. 248,164, filed Apr. 27, 1972 now abandoned.

BACKGROUND OF THE INVENTION

The NTSC color television signal presently in use includes a wide-band brightness or luminance (Y) signal and a modulated subcarrier signal of approximately 3.58mhz. The subcarrier signal is phase and amplitude modulated by color difference signals (R-Y, B-Y, and G-Y), so that phases of the subcarrier each represent the hue of an image portion and the subcarrier amplitude at that phase represents the saturation of that hue. A monochrome receiver visibly reproduces only the Y component.

The usual color receiver includes color demodulators for synchronously recovering the color difference signals which then can be added to the Y signal for developing the red, blue and green representative signals to be reproduced by the cathode ray tube. Other receivers include direct demodulators for directly developing the red, blue and green color representative signals, thereby avoiding the separate recovery and combination of the brightness signal with the demodulated color difference signals.

In either of these types of demodulators, however, it is necessary to provide a properly phased reference signal of the subcarrier frequency in order to produce output color representative signals at the proper hues. In the NTSC system, this is accomplished by including in the television signal bursts of a reference signal of the same frequency as the color subcarrier and having a particular phase relationship with the different phases of the subcarrier representating the different hues. These reference signal bursts are recovered at the receiver by a gating action and are applied to an automatic frequency control circuit associated with the local oscillator at the receiver. The recovered bursts and the output signal from the oscillator are compared to develop a control signal which is utilized to control the oscillator, so that its output signal is a continuous wave of the proper frequency and phase to be used as a demodulating signal for the color subcarriers. Since the burst theoretically occupies a position having a precise phase relationship with the modulated subcarrier signals, a local oscillator which is phase locked to this burst signal should provide an accurate reference signal for demodulating the correct hues of the transmitted signal.

In actual practice, however, it has been found that the transmitted burst does not always occupy the same phase relationship with the modulated color difference signals. This occurs due to the fact that the burst signal is not carried through the entire chain of signals at the transmitter but is reinserted into the signal prior to transmission thereof. If accurate control is not obtained over the precise phase of the reinserted burst, a deviation in the correct hue of the demodulated color difference signals occurs at the receiver. As a result, shifts in hue may occur during received programming when changes are made from camera to camera, station to station, from live telecasts to tape telecasts to film, or from network transmission to local transmission. Any time an improper phase relationship exists between the burst signal and the remainder of the transmitted signal for any reason, a shift in the hue of the reproduced colors at the television receiver occurs. For most objects, such a shift in hue or color is not detectable by the viewer since there is no reference based on previous information with which the viewer may make an exact comparison. If, however, the scene being reproduced includes flesh tones, immediately a viewer detects errors in the color reproduction since there is a preestablished reference for such flesh tones in the mind of the viewer. As a consequence, it is necessary to readjust the hue control establishing the phase of the local oscillator in order to reproduce the flesh tones accurately. If another shift in the phase relationship of the burst signal occurs, it again is necessary to readjust the hue control in order to cause the reproduced picture to be satisfying to the viewer. Thus it is desirable to provide a television receiver in which changes in the phase relationship of the burst signal can be automatically compensated at the receiver.

Since the flesh tones lie along the +I axis, a means for correctly determining the phase of the +I axis in the transmitted signal and causing the output of the local oscillator to be at a predetermined phase with respect to the +I axis should result in satisfactory color reproduction, irrespective of the location of the burst signal. Systems have been proposed to alter the relative phases of the reference or local oscillator signal and the subcarrier signal to shift the phases in such a manner to expand the region about the +I axis which will be reproduced as a flesh tone color. Although systems of this type have been proposed which provide a satisfactory flesh tone correction for the various errors which take place in the transmitted and received signals, such correction systems also tend to alter the phases of other colors not lying about the +I axis. Such undesirable phase shift is most noticeable for green signals which lie substantially on the Q axis. It is desirable to provide a color correction for signals in the region of the +I axis to insure correct reproduction of flesh tones but to disable the correction or apply no correction for signals having a hue in the green region in order that the color spectrum reproduced by the color television receiver will have the most realistic appearance to the viewer.

SUMMARY OF THE INVENTION

Accordingly it is an object of this invention to provide an improved automatic hue control system for a color television receiver.

It is an additional object of this invention to provide an automatic hue control circuit which provides a hue control only in a narrow wedge or angle on each side of the I-axis and leaving substantially unaffected hues lying outside of this wedge.

It is a further object of this invention to employ an automatic hue control circuit in which the color signals are split into I and Q components, with these components being compared to pass or block the Q components on the basis of the comparison to provide a modified color signal for use in reproducing the color signals utilized to drive the cathode ray tube of a television receiver.

In accordance with a preferred embodiment of this invention, the chroma signal components of a received signal in a color television receiver are split into I and Q components, either at base-band or subcarrier frequencies. A voltage corresponding to the absolute value of the Q components ( $|E_Q|$ ) then is compared in a comparator circuit with a control voltage having a predetermined magnitude relative to the magnitude of the demodulated +I signal components. The output of the comparator is applied to a gate to enable the gate only when $|E_Q|$ is greater than the value of the control voltage derived from the demodulated +I components. A reconstructed signal then is obtained by combining in an adder the I signal components with the output of the gate, to the input of which the Q signal components are applied. When the gate is enabled to pass the Q signal components, no modification of the chroma signal takes place. When the gate is blocked, however, the only signal obtained from the adder is the I signal component. Thus, the system operates to collapse signals appearing near the +I axis to the +I axis to produce a modified chroma signal. The output of the adder is utilized to produce the color signals supplied to the cathode ray tube of the color television receiver.

BRIEF DESCRIPTION OF THE DRAWING

FIG. 1 is a block diagram of a preferred embodiment of the invention;

FIG. 2 is a block diagram of another preferred embodiment of the invention;

FIG. 3 is a diagram showing the manner in which

FIGS. 4 and 5 comprise a schematic circuit diagram of a portion of the circuit shown in FIG. 2.

DETAILED DESCRIPTION

Figures 1, 2, 3:
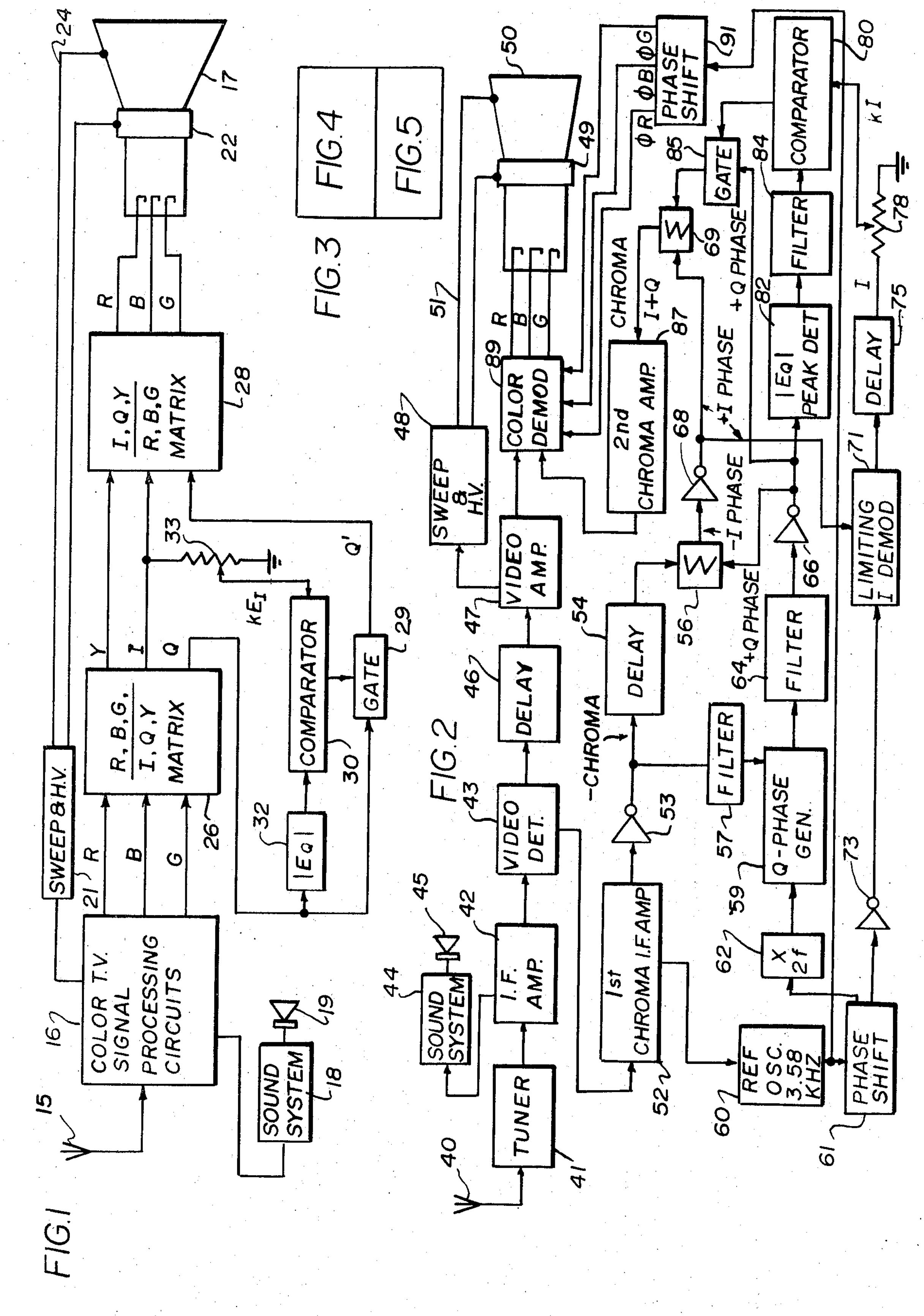

Referring now to FIG. 1, there is shown a block diagram of a color television receiver employing direct color demodulation which has been modified to incorporate an automatic hue control circuit in accordance with an embodiment of this invention. Input television signals, which are the standard NTSC color television signals, having brightness signal components, a subcarrier signal component modulated by the R-Y, B-Y and G-Y color difference signals representing hue and saturation at different phases of the subcarrier, burst signal components, and synchronizing signal components, along with sound components, are applied to an antenna 15 which feeds these signals to the color television signal processing circuits 16. The signal processing circuits 16 include the conventional tuner, RF and IF amplifiers, second detectors, video and chroma amplifiers, and demodulators.

For the purpose of this description, the demodulators of the processing circuits 16 are considered to be direct demodulators, producing at the outputs thereof the demodulated red, blue and green color signals. Normally, these signals are used directly to drive the cathodes of a color cathode ray tube 17. In addition, the color television signal processing circuits 16 provide an output to a conventional sound system 18 which drives a loudspeaker 19 to reproduce the sound accompanying the video and color signals.

The signal processing circuits 16 also supply signals to a sweep and high voltage circuit 21 which has an output connected to the deflection yoke 22 located on the neck of the cathode ray tube 17. In addition, the sweep and high voltage system 21 also provides a high voltage over a lead 24 to the screen of the shadow mask of the cathode ray tube 17 in a conventional manner.

As stated previously, the red, blue and green output signals from the signal processing circuits 16 normally are utilized directly to drive the cathodes of the cathode ray tube 17. As shown in FIG. 1, however, these three color representative signals are applied to a red (R), blue (B), green (G)/I, Q, Y matrix circuit 26 which converts the baseband red, blue and green color signals obtained from the circuits 16 into the brightness or Y signal component and I and Q color components, corresponding to the signals present on the I and Q axis of the standard NTSC color television signal. The matrix 26 may be of a conventional resistor matrix form or any other standard form. To convert the R, B, and G baseband color signals into the I, Q and Y signals, the following matrix constants are established for the matrix 26:

$$E_Y = 0.30R + 0.59G + 0.11B$$

$$E_I = 0.59R - 0.28G - 0.32B$$

$$E_Q = 0.21R - 0.52G + 0.31B$$

where $E_Y$, $E_I$, and $E_Q$, correspond to the Y, I and Q outputs shown in FIG. 1 for the matrix 26, and R, G, and B correspond to the similarly identified outputs of the signal processing circuits 16. The Y and I components from the matrix 26 are applied to two inputs of another matrix 28 which is utilized to recombine the signals from the output of the matrix 26 into the original R, B and G signal components.

The Q signal components from the output of the matrix 26, however, are not applied directly to the input of the matrix 28 but instead are applied to the input of a gate 29 which either permits passage of the Q components or blocks their passage under control of the output of a comparator circuit 30. Thus, when the gate 29 passes the Q signal components, the signals combined by the matrix 28 for converting I, Q and Y components back into the R, B and G signal components are unmodified and the signals at the outputs of the matrix 28 are the same as the signals applied to the inputs of the matrix 26 from the signal processing circuits 16. When the Q signal components, however, are blocked by the gate 29, the matrix 28 produces the R, B and G signal components from the Y and I components only since, with the gate 29 blocked, no Q signal components are applied to the input of the matrix 28. To effect the conversion back to R, G and B signals, the following constants are established for the matrix 28:

$$E_R = Y + 0.96I + 0.62Q$$

$$E_G = Y - 0.27I - 0.65Q$$

$$E_B = Y - 1.101I + 1.70Q$$

The determination as to whether or not the Q signal components will be supplied to the input of the matrix 28 is based upon the comparison of the absolute value of Q ( $|E_Q|$ ) which is determined by a suitable peak detector circuit 32, employing a full-wave rectifier or the like, which supplies a positive control signal or voltage to one of the two inputs of the comparator 30. The other control signal or voltage applied to the other input of the comparator 30 is derived from the I signal component and is a fraction of the voltage for the I signal component as obtained from a potentiometer 33, shown connected between the I output of the matrix 26 and ground. This other control voltage varies between positive values for +I components and negative values for −I components. Any fraction of the +I signal components may be compared with $|E_Q|$ from an amount comprising the entire I signal component voltage to zero, which would be effected by connecting the tap on the potentiometer 33 to ground. Whenever the absolute value, $|E_Q|$ of the output of the detector 32 is greater than (more positive than) the value of the control signal applied to the other side of the comparator 30 from the potentiometer 33, the gate 29 is enabled by the output of the comparator 30. The Q signal components then are passed through the gate 29 to the matrix 28. Whenever the I signal component $kE_I$ (where $k$ is a constant determined by the setting of the potentiometer 33) is greater than $|E_Q|$, the gate 29 is closed or blocked, and no Q signal components are applied to the matrix 28. In this manner, signals near the +I axis in which the fraction of the I components thereof ($kE_I$) is greater than the absolute value of the Q components thereof ( $|E_Q|$ ) are collapsed to the +I axis to provide the desired flesh tone correction.

The operation of the circuit of FIG. 1 may be more readily understood by reference to FIGS. 6 to 9. All of these figures show vector diagrams of the relative phases for the I and Q and R-Y and B-Y axes of the NTSC color television subcarrier signal. In interpreting a plot of a point or dot representative of a particular color hue and saturation on any one of the vector diagrams 6 to 9, the phase angle of the vector from the origin or center point of the diagram to the dot or color location provides an indication of the hue, while the length of the vector is indicative of color saturation or intensity when considered along with the corresponding luminance level. Thus any color can be represented by a vector at a particular phase in the diagram while the saturation of that color is represented by the length of the vector. It also is apparent that each vector has components which project on the I and Q axes, so that all of the vectors can be defined in terms of their projections on these axes.

Figure 6:
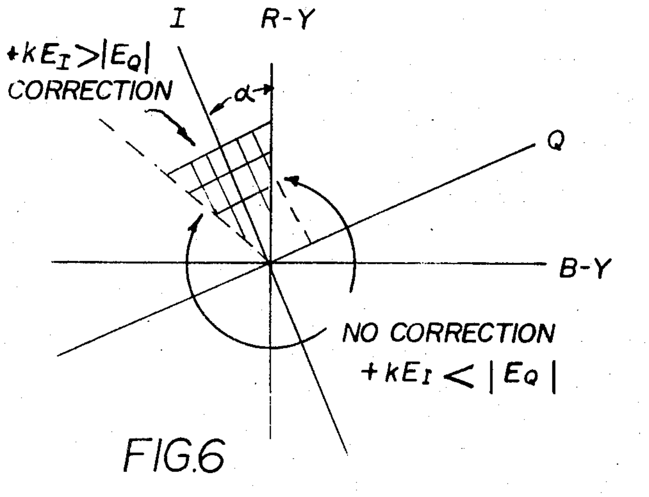
FIGS. 6 to 10 illustrate various phase relationships of signals useful in explaining the operation of the circuits shown in FIGS. 1, 2, 4 and 5.

The meaning of this in terms of the operation of FIG. 1 is that when the projection of a vector on either the +Q or −Q axis ( $|E_Q|$ ) is greater than the value of $+kE_I$, no correction occurs. This is indicated in FIG. 6 by the greater part of the circle which is so labeled in FIG. 6. When the value $+kE_I$, however, is greater than the absolute value of $E_Q$ ( $|E_Q|$ ) the correction takes place by blocking the gate 29. Then only I and Y signals are applied to the matrix 28 to be converted into the R, B and G color signals. The area in which this occurs is indicated in FIG. 6 by the shaded portion, with the half angle alpha ($\alpha$) being determined by the ratio of $+kE_I$ to $|E_Q|$. Thus, any signal lying within the half angle alpha on either side of the +I axis will have the Q component removed by the circuit of FIG. 1 prior to being applied to the input of the matrix 23. Thus, such signals are collapsed to the I axis to provide the desirable correction of flesh tones which, as stated previously, predominantly lie along the I axis. The half angle alpha can be varied with the circuit of FIG. 1 from 45° on each side of the +I axis to zero by adjustment of the tap of the potentiometer 33. Thus, it is possible to select the area in which the hue correction is desired to take place, while no correction takes place outside of the half angle alpha on either side of the +I axis. It should be noted that −I signals applied to the input of the comparator 30 automatically are less than the absolute value of Q (which is a positive voltage in the circuit of FIG. 1), so that for −I signals the gate 29 always is enabled.

Figure 7:
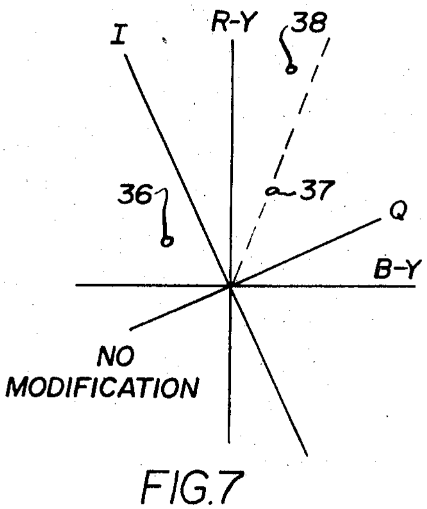

Referring now to FIG. 7 there is shown a color vector diagram for a conventional color television receiver in which no modification takes place for color signals represented by spots 36, 37 and 38. When these same color signals are applied to the circuit of FIG. 1, they are variously affected or remain unaffected in accordance with the relationship estalished between $+kE_I$ and $|E_Q|$.

Figure 8:
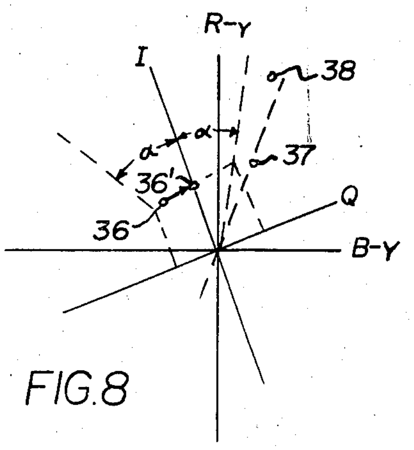

Referring now to FIG. 8, there is shown an illustration in which the ratio of $+kE_I$ to $|E_Q|$ provides the angle alpha on each side of the +I axis to determine the area within which signals will be moved to the +I axis by the circuit of FIG. 1. From an examination of FIG. 8, it can be seen that the color spot 36 falling just to the left of the +I axis is in this region covered by the half angle alpha, so that the circuit of FIG. 1 operates to move colors at the spot 36 to the +I axis. This is shown in FIG. 8 by the spot 36', which results from the collapse of the Q component blocked by the gate 29 for colors falling within the half angle alpha on each side of the +I axis. With the constant k selected to provide the angles shown in FIG. 8, the color spots 37 and 38 are unaffected by the operation of the circuit since the absolute value of the Q component ( $|E_Q|$ ) for these two color spots is greater than the value $+kE_I$. Any color spot lying within the wedge formed by the half angles alpha will be moved all the way to the +I axis by the circuit of FIG. 1. If movement all the way to +I is not desired, it is apparent that the gate 29, instead of blocking all of the Q components, could permit a certain fraction or percentage of the Q components to pass, this fraction of course, being less than the full value of the Q components.

Figure 9:
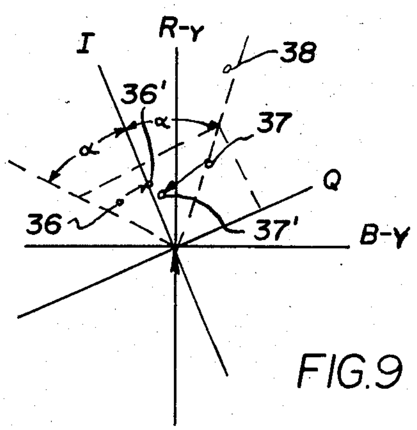

In FIG. 9 the half angle alpha has been widened by causing the value of k to approach 1, so that the wedge formed by the two half angles alpha now is approximately 90°. In this situation, the spots 36 and 37 both are moved to the +I axis, as indicated by the spots 36' and 37' in FIG. 9. It is apparent that the spot 38 also would be moved all the way to the +I axis since it also is within the wedge formed by the angles alpha. An examination of FIG. 9 shows that it might be undesirable to have colors located at the point 38 to the right of the R-Y axis move all the way to the +I axis, so that a much narrower wedge closer to the +I axis generally would be preferable. FIG. 9 is utilized however, to show that the width of the wedge can be varied by moving the tap on the potentiometer 33 to modify colors lying at different distances from the +I axis as may be necessitated by any particular application of the circuit.

Referring now to FIG. 2 there is shown a block diagram of an automatic hue control circuit based on the same principles as the circuit shown in FIG. 1 but operating on the subcarrier signal frequency components rather than on the demodulated or base-band components as shown in FIG. 1. In FIG. 2, the composite NTSC color television signals are received on an antenna 40 and applied to a tuner circuit 41 which includes the conventional tuner, RF amplifier and converter for producing intermediate frequency signals which are supplied to an intermediate frequency amplifier 42, from which the sound signals are applied to a sound system 44 and reproduced on a loud speaker 45. The output of the IF amplifier 42 also is supplied to a video detector 43 which in turn is coupled to a video amplifier 47 through a delay circuit 46 which is used in the circuit to compensate for delays occurring in the chrominance signal path, as is well known. The video amplifier 47 supplies signals to a sweep and high voltage circuit 48 which has outputs connected to a deflection yoke 49 on a cathode ray tube 50. The sweep and high voltage system 48 also provides a high voltage for the screen of the shadow mask of the cathode ray tube 50 over a lead 51 in a conventional manner.

The video detector 43 also supplies signal to a first chroma IF amplifier stage 52 which is used to process the modulated chroma signal components of the received composite signal. In the chroma IF amplifier stage 52, there is a bandpass filter network for selecting the color subcarrier at 3.58 megahertz and its associated sidebands, and these signals are applied through an inverter 53 and a delay circuit 54 to one of two inputs of an adder circuit 56. The minus chroma signal components obtained from the output of the inverter 53 also are applied through a filter 57 to one input of a Q phase generator circuit 59.

To generate a Q subcarrier signal component in the circuit 59, an output of the first chroma IF amplifier (taken from an earlier stage of the amplifier) is coupled to a color synchronizing oscillator 60 which selects the burst signals appearing on the "back porch" of the horizontal synchronizing pulses to develop a color reference signal of 3.58 megahertz in synchronism with the burst signal. This color reference signal is supplied through a phase shift circuit 61, which in turn supplies a 3.58 megahertz signal at the Q phase to a frequency doubler 62, the output of which also is applied to the Q phase generator 59. The Q phase generator 59 then mixes the 7.16 megahertz reference signal from the doubler 62 with the 3.58 megahertz modulated minus chroma signal and produces a 3.58 megahertz output signal modulated by signal components at the Q phase. The operation of this circuit is described in more detail subsequently in the description of FIGS. 4 and 5. To eliminate any residual 7.16 megahertz reference signals from the output of the Q phase generator, the output is passed through a filter 64 which removes these components. The output of the filter 64 also is inverted by an inverter 66 to provide a +Q phase signal which is applied to the other input of the adder circuit 56.

By adding the +Q phase 3.58 megahertz signal and the minus chroma modulated subcarrier signal in the adder circuit 56, the Q phase signals are exactly out of phase and cancel so that the output of the adder circuit 56 is a −I phase modulated signal at the 3.58 subcarrier frequency. This signal is inverted to a +I phase modulated signal by an inverter 68 and is applied as one input to an adder circuit 69 and as an input to a limiting I demodulator 71.

To demodulate the +I phase signal for utilization in the control circuit shown in FIG. 2, a second output of the phase shift circuit 61 at −I phase is supplied through an inverter 73 which applies a +I phase reference signal at 3.58 megahertz to the limiting I demodulator 71. This causes the demodulator 71 to produce at its output a limited I base-band or demodulated signal. The magnitude of the reference signal applied to the limiting demodulator 71 from the inverter 73 is selected to be less than the maximum magnitudes of the +I phase signals applied thereto. As a consequence, the output of the demodulator 71 is a limited I demodulated to baseband output in which the maximum amplitude of the demodulated I signals is clamped to a value determined by the value of the 3.58 reference signal applied to the demodulator 71. This serves the purpose of inhibiting the operation of the hue control circuit for highly saturated signals which lie within the wedge or angle of control of the circuit. This operation will be explained more fully subsequently.

The limited I signals then are supplied through a delay circuit 75, used to supply a necessary delay to maintain the timing of the various signals in the hue control circuit in proper time relationship with one another, to one end of a potentiometer 78 similar to the potentiometer 33 in FIG. 1. The value $kI$ is determined by the point on the potentiometer 78 to which the tap is connected and constitutes a control voltage which is applied to one of two inputs of a suitable comparator circuit 80.

The comparator circuit 80 of FIG. 2 is comparable to the comparator circuit 30 of FIG. 1 and is supplied on its other input with the absolute value of the demodulated Q components ( $|E_Q|$ ) for comparison in the same manner as in FIG. 1. These components are obtained from the output of the inverter 66 which is applied to an $|E_Q|$ peak detector circuit 81, the output of which is supplied through a filter 84 to remove any residual 3.58 megahertz components. The output of the filter 84 then comprises the second control voltage applied to the comparator 80.

The operation of the comparator 80 is the same as the operation of the comparator 30 in FIG. 1 to supply an enabling signal to a gate 85 to permit the +Q phase signals obtained from the inverter 66 to be passed by the gate 85 whenever $|E_Q|$ is greater than the value of the first control signal $kI$ applied to the other input of the comparator 80. When the reverse relationship of the control signals exists, the gate 85 blocks the passage of Q phase signals through it.

The output of the gate 85 is combined with the +I phase signals in the adder circuit 69 which supplies a modified chroma signal with the +I and +Q components to a second chroma amplifier stage 87. As discussed in conjunction with FIG. 1, so long as the absolute value of the Q components ( $|E_Q|$ ) is greater than the value of $kI$, the signal applied to the input of the second chroma amplifier 87 is the same as the signal obtained from the output of the first chroma IF amplifier 52. Whenever the $kI$ component is greater than the absolute value of the Q components, however, only I phase chroma components are applied to the input of the second chroma amplifier circuit 87. The output of the chroma amplifier 87 is connected to the color demodulator circuit 89 which also is supplied with the video or brightness signal components from the video amplifier 45. The color demodulator circuit 89 is illustrated as a direct demodulator supplied with 3.58 megahertz reference signals at the proper phases from a phase shift circuit 91 to produce demodulated red, blue and green color signals for driving the cathode of the cathode ray tube 49.

From the foregoing, it can be seen that the operation of FIGS. 1 and 2 is substantially the same, with the exception that the circuit shown in FIG. 2 operates on the subcarrier or 3.58 megahertz components while the circuit shown in FIG. 1 operates on the demodulated or base-band signal components.

As stated previously in conjunction with the description of FIG. 2, the demodulator 71 is a limiting demodulator, limiting the maximum amplitude of the I demodulated signal components which can be obtained therefrom to a value determined by the magnitude of the 3.58 megahertz reference signal applied to the demodulator 71. This is done to prevent the shifting in phase of high saturation signals which otherwise lie within the wedge or angle of signals affected by the hue control circuit of FIG. 2. The manner in which this is accomplished is shown in FIG. 10, in which the half angle alpha is illustrated as being sufficient to cause the color spots 36 and 37 to be moved to the +I axis as shown by 36' and 37' in FIG. 10.

Figure 10:
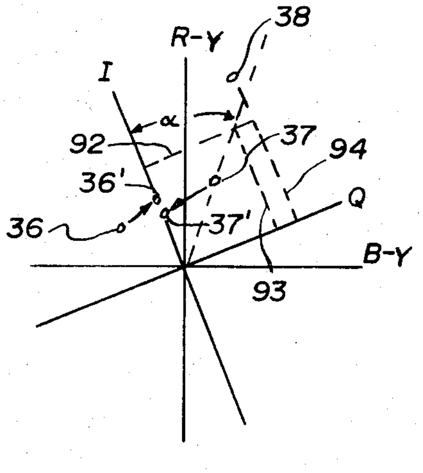

It is noted that the color spot 38, representative of a highly saturated color falling just to the right of the R-Y axis, also is within the wedge of the half angle alpha in FIG. 10. Without the limiting operation of the demodulator 71, the color spot 38 also would be moved to the +I axis. Facial tones of the type which the circuit is designed to correct normally are low saturation colors, so that a color falling at the high intensity or high saturation point of the spot 38 most likely is not a facial tone and therefore should be reproduced without modification. This is accomplished by the action of the limiting demodulator 71. The dotted line 92 in FIG. 10 represents the maximum value of *k*I which can be obtained from the output of the limiting I demodulator 71, so that the corresponding dotted line 93 projecting on the Q axis indicates the maximum value of $|E_Q|$ which can occur for color spots within the correction wedge before the comparator 80 enables the gate 85. If the maximum value of *k*I is held to the value 92 shown in FIG. 10, a color spot 38 which has a projection on the Q axis indicated by the dotted line 94 causes the absolute value of Q ( $|E_Q|$ ) which is obtained by such a projection to exceed the limited value *k*I shown by the line 92. As a consequence, the gate 85 is enabled, passing the Q components to the adder 69; and no color correction takes place for the highly saturated colors such as color 38 shown in FIG. 10. By the use of the limiting I demodulator 71 in conjunction with the potentiometer 78, the range or area over which the hue control circuit is rendered effective may be varied considerably to suit the operating conditions of the particular television receiver in which it is used. As stated previously, since facial tones normally are low-saturation colors it is desirable to limit the output *k*I as much as possible to permit the faithful reproduction of highy saturated colors while still providing the desirable result of correcting for face tone errors in the reproduced picture.

Figure 4:
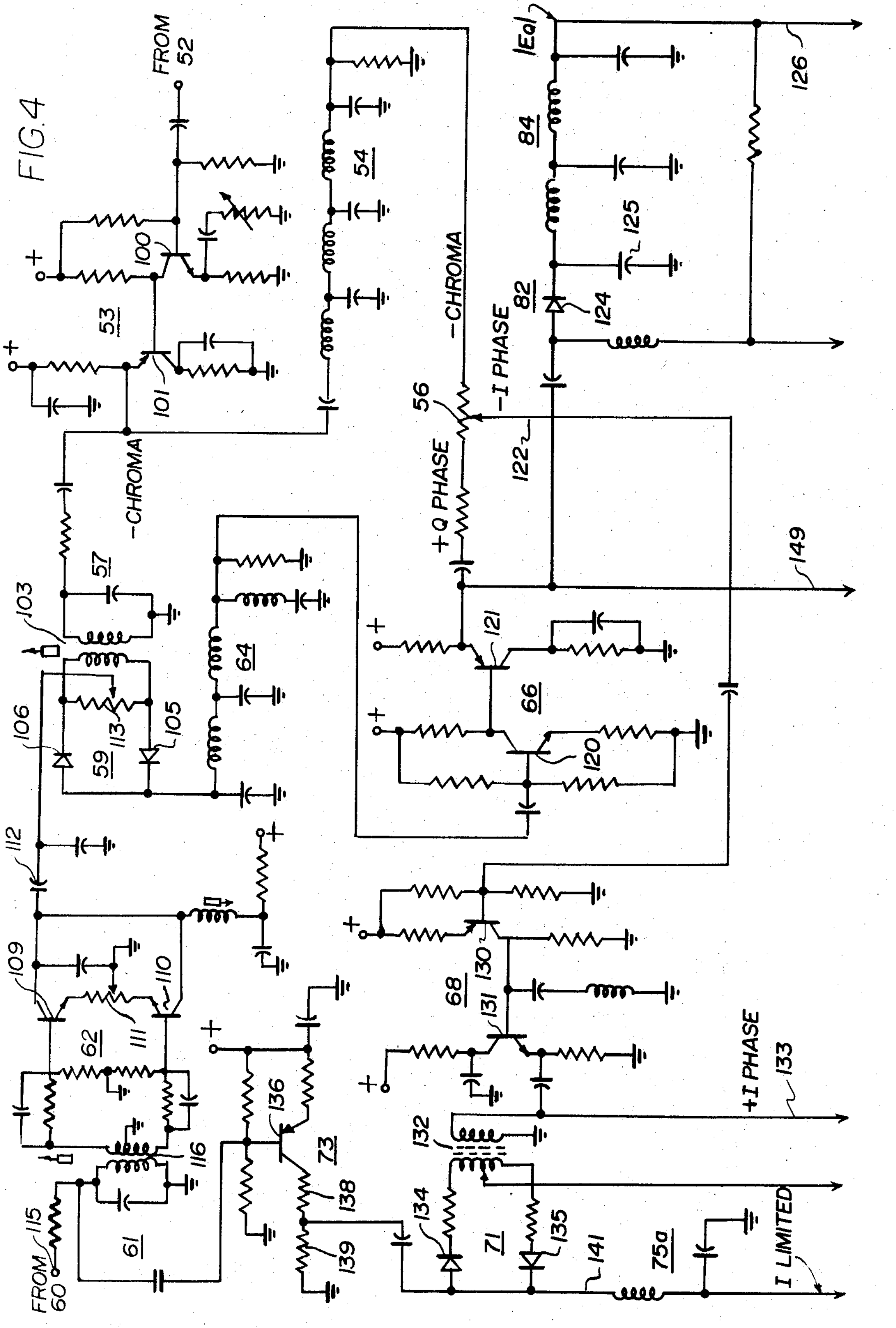
FIGS. 4 and 5 are to be placed together to form a single circuit diagram.
Figure 5:
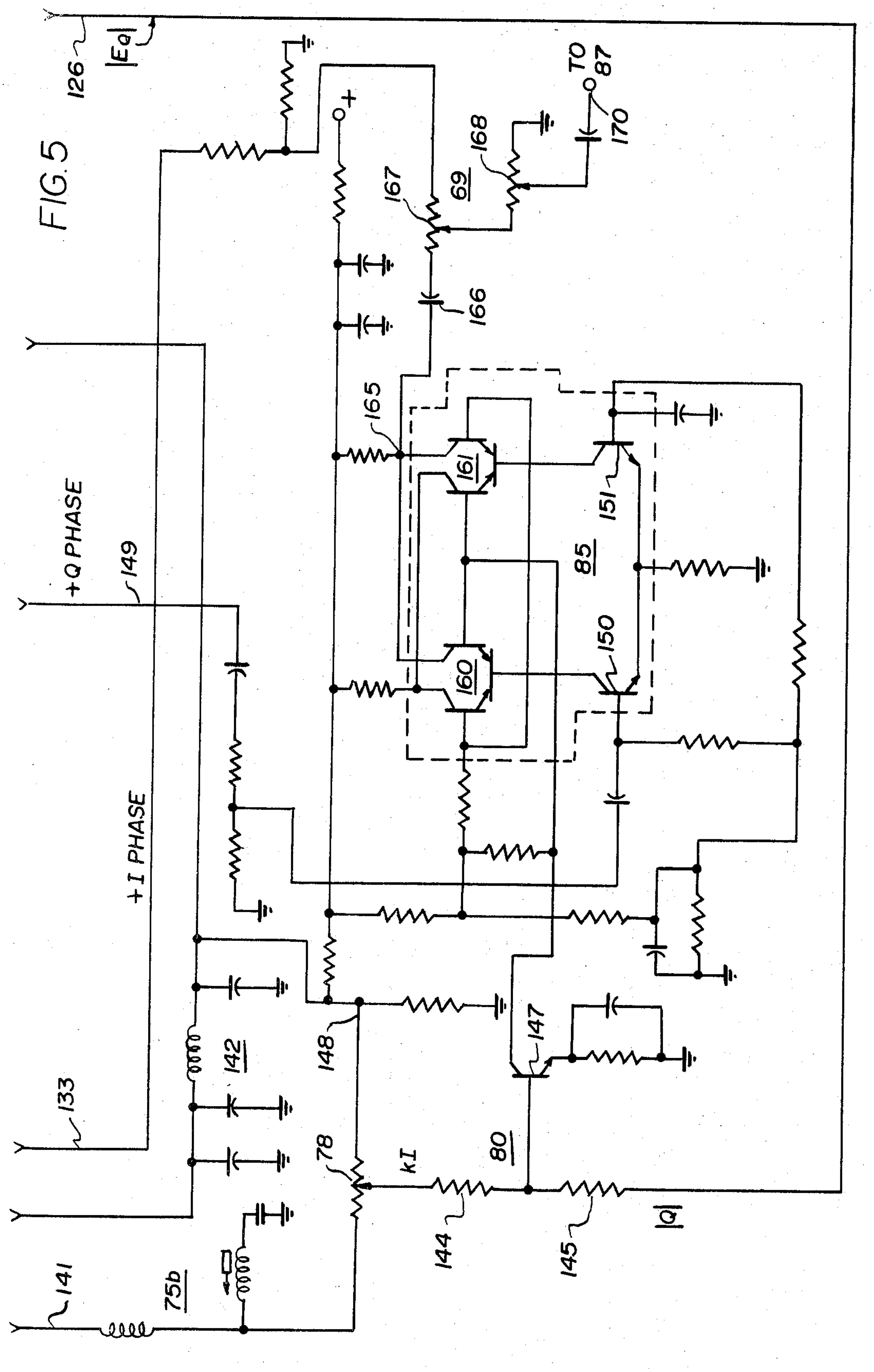

FIGS. 4 and 5, when placed together as shown in FIG. 3, comprise a detailed schematic diagram of the hue control portion of the circuit shown in FIG. 2. To facilitate an understanding of the circuit shown in FIGS. 4 and 5 and to correlate it with the circuit shown in FIG. 2, the same reference numbers used for the blocks used in FIG. 2 are located adjacent the appropriate portions corresponding to those blocks in FIGS. 4 and 5.

In FIG. 4, the output signals from the first chroma IF amplifier 52 are applied to the input of an inverting NPN amplifier transistor 100, shown in the upper right hand corner of FIG. 4. The transistor 100 has its collector connected to the base of a PNP emitter follower transistor 101, and together the transistors 100 and 101 with their emitter and collector circuit connections comprise the inverter 53.

The signals on the emitter of the transistor 101 then constitute the minus chroma signals previously described in conjunction with FIG. 2. The emitter follower 101 acts as an isolating buffer between the signals on the collector of the inverting amplifier 100 and the input to the filter 57 of the Q phase generator circuit 59. The filter 57 is in the form of a tuned transformer 103 which is tuned to the 3.58 megahertz subcarrier signal appearing on the emitter of the emitter follower transistor 101.

The minus chroma signals are applied by the transformer 103 to a balanced modulator 59, which comprises the Q phase generator. The modulator 59 includes a pair of diodes 105 and 106 connected to opposite ends of the secondary of the transformer 103 and poled in opposite directions. The modulator 59 also is supplied with reference signals at a 7.16 megahertz rate from a frequency doubler 62 including a pair of NPN transistors 109 and 110, the emitters of which are connected through a common resistor 111 with an adjustable tap to ground, and the collectors of which are connected together and through a coupling capacitor 112 to the tap of an unbalancing resistor 113 connected across the secondary winding of the transformer 103 at the junctions of the ends of this transformer with the diodes 106 and 105.

To select the proper phase at which the Q phase generator 59 is to operate, input reference signals at the 3.58 megahertz frequency are obtained from the reference oscillator 60 (FIG. 2) on a terminal 115 and are applied to a phase shifting circuit 61. Reference signals of 3.58 megahertz at the Q phase are provided by the circuit 61 to a transformer 116 forming part of the phase shifting circuit 61 and tuned to 3.58 megahertz. The opposite ends of the secondary winding of the transformer 116 are coupled with the bases of the frequency doubling transistors 109 and 110 in the doubling circuit 62. Thus, the output of the doubling circuit 62 applied through the capacitor 112 is a 7.16 megahertz signal which is in phase with the 3.58 megahertz signal at the Q phase of the minus chroma subcarrier applied to the modulator 59.

The tap on the resistor 113 is adjusted to cause a slight unbalance on the blanced modulator 59, with the result that some of the original or input signals applied to the modulator 59 from the emitter follower 101 are fed through the modulator and added to the modulated signals at its output. This causes the quadrature signal components (that is those signals which are in quadrature with the Q phase components) to be added together out of phase and to cancel. As a result, only −Q phase components of the subcarrier chroma signal are obtained at the output of the modulator 59 at the junction of the anode of the diode 106 and the cathode of the diode 105.

Signals signal obtained from the output of the Q phase modulator 59 are passed through a filter 64 which removes spurious signals, including the 7.16 megahertz gating signal, from the output of the Q phase generator 59. The −Q phase signals then are applied to the base of an NPN inverting amplifier transistor 120, the collector of which is connected to the base of a PNP emitter follower transistor 121, with the transistors 120 and 121 together comprising the inverter 66 shown in FIG. 2. Signal inversion caused by the transistor 120 results in a +Q phase signal appearing on the emitter of the emitter follower transistor 121. This signal is added or combined in a matrix resistor 56 with the minus chroma signal obtained from the emitter of the emitter follower transistor 101, after this latter signal has passed through the delay line 54.

The delay of the delay line 54 is selected to be equal to the delay which is imposed by the filter 57 (in the form of the tuned transformer 103) and the filter 64, so that the minus chroma signal and the +Q phase signal are in synchronism when they are added together in the matrix resistor 56. This addition produces on the output tap of the resistor 56 a −I phase signal, since the +Q phase signal added to the minus chroma signal cancels all of the −Q phase signal components from the minus chroma signal, leaving only −I phase subcarrier signals. These −I phase signals appear on the lead 122 and are at the subcarrier frequency of 3.58 megahertz.

To produce the absolute value of Q ( $|E_Q|$ ), control voltage, a simple peak detector 82 including a diode 124 and a capacitor 125 is coupled to the emitter of the emitter follower transistor 121, and the +Q phase signal is applied to it. The absolute value of Q control voltage obtained from the peak detector 82 is supplied to a filter 84 to remove ripple components from it. This control voltage, $|E_Q|$ appears on the lead 126 and is used in the operation of the comparator circuit 80 as previously discussed in conjunction with FIG. 2.

The −I phase signals appearing on the lead 122 are applied to an inverting amplifier 68, including an NPN inverting amplifier transistor 130 and a PNP emitter follower transistor 131. Signals appearing on the emitter of the transistor 131 then comprise +I phase signals supplied to a lead 133 and supplied to the primary winding of a coupling transformer 132 used to supply the +I phase signals to a balanced demodulator 71 for obtaining the demodulated I output.

The 3.58 megahertz reference signals at the I phase are applied from the phase shift circuit 61 to the base of a PNP inverting transistor 136. The collector of the transistor 136 is coupled through a divider circuit 138 and 139 to ground, and the tap between the resistors 138 and 139 couples the I phase 3.58 reference signal from the phase shift circuit 61 to a pair of diodes 134 and 135 of the balanced demodulator 71. This 3.58 megahertz reference signal is limited by the resistors 138 and 139 to a value below the peak value of the I phase signal components applied to the limiting demodulator 71. As a result, the demodulated I base-band output of the demodulator 71, obtained from the junction of the anode of the diode 134 and the cathode of the diode 135, is limited to less than the maximum amplitude or saturation which can be reached by the I signal components. As described in conjunction with FIGS. 2 and 10, this limiting of the I output causes high level chroma signals to be modified less than low level chroma signals. This permits the greatest degree of correction to occur around the flesh region in both hue and saturation when the circuit shown in FIGS. 2, 4 and 5 is employed without affecting high saturation colors near the I axis.

The limited demodulated I component obtained from the demodulator 71 is passed over a lead 141 to the filter 75, which removes the 3.58 megahertz switching signal and the delay of which is selected to be equal to the delay imposed by the filter 84 coupled to the output of the peak detector for producing $|E_Q|$. The value $k$I, where $k$ is equal to or a fraction of one, is provided by the tap position on potentiometer 78 shown in FIG. 5. The tap on the potentiometer 78 is adjustable to permit a selection of the desired fraction of the demodulated I component to be supplied to a resistor matrix 80, including a pair of resistors 144 and 145, the junction of which is coupled to the base of an NPN switching transistor 147.

A quiescent direct current bias for the base of the transistor 147 is supplied over a lead 148 from a suitable source of B+ potential (not shown). This quiescent bias is sufficient to bias the transistor 147 to a threshold of conduction condition. To cause the demodulated I component and the $|E_Q|$ component applied to the resistors 144 and 145 to respectively decrease and increase this quiescent bias, it also is applied through an isolating filter 142 to the I demodulator 71 and to the anode of the diode 124 in the peak detector 82.

The resistor 145 is supplied with the absolute value of Q components ( $|E_Q|$ ) on the lead 126 and the potential at the junction of the resistors 144 and 145 on the base of the transistor 147 represents the comparison of $k$I with the absolute value of Q ( $|E_Q|$ ). The polarity of the demodulated I signal from the demodulator 71 is selected to reduce the forward bias on the base of the transistor 147 to drive it toward cutoff, while the polarity of $|E_Q|$ is selected to increase the forward bias on the base of the transistor 147 to drive it toward saturation. Thus, the control signal $|E_Q|$ keeps the transistor 147 fully conductive or saturated, except for the condition where $k$I exceeds $|E_Q|$, whereupon the transistor 147 is driven to cutoff. Where $kI \cong |E_Q|$ the transistor 147 is in a partial or transitional state of conduction. Thus, the resistors 144, 145 and transistor 147 operate as the comparator circuit 80. It is apparent that this simple comparator circuit could be replaced with a differential type of comparator circuit if so desired. The particular form of the comparator 80 is not important.

The gating circuit 85 is shown in FIG. 5 as a doubly balanced steering type of gate which eliminates the control signal from the output of the gate. The +Q phase subcarrier signals which are to be gated by the gate 85 are applied from the emitter of the transistor 121 (FIG. 4) over a lead 149 to the base of an input NPN transistor 150 in the gate 85, with the transistor 150 comprising one-half of a differential amplifier pair 150, 151. The signals appearing on the collectors of the transistors 150 and 151 then comprise opposite phases of the Q components of the 3.58 subcarrier. These signals are in turn coupled to another pair of differential switching amplifiers 160 and 161, with corresponding collectors of the transistors of the pairs 160 and 161 being cross-coupled to provide the output from the gate 85.

If the transistor 147 of the comparator circuit is nonconductive, equal bias is applied to the bases of all of the transistors 160 and 161 in the upper differential pairs of the gate 85. This condition causes a cancellation of the Q phase signal components at the junction 165 comprising the output of the switch, since as the conductivity of the transistor 150 becomes less, the conductivity of the transistor 151 increases in the same amount and vice-versa. This also is reflected by the signals passing through the right hand transistors of the differential pairs 160 and 161, so that an equal and opposite compensation effect takes place and no variation in signal occurs at the junction 165. For this condition of operation, the +Q phase components applied to the base of the transistor 150 then are blocked and do not appear on the junction 165.

When the transistor 147 is rendered fully conductive or saturated, however, for a condition in which the absolute value of Q ( $|E_Q|$ ) applied to the resistor 145 exceeds the value kI applied to the resistor 144, the inner transistors of the differential pairs 160 and 161 are rendered nonconductive, with the outer transistors of each of these pairs being rendered conductive. As a consequence, variations in the conductivity of the transistor 151 then do cause a corresponding variation in the conductivity of the right hand transistor of the pair 161; so that +Q phase components of the signal do appear at the junction 165. Therefore, these components may be considered to be passed by the gate 85.

When the value of $kI \cong |E_Q|$, the potential on the collector of the transistor 147 causes the inner transistors of the differential pairs 160 and 161 to be less conductive than the outer transistors, but the inner transistors are not rendered nonconductive. The cross-coupling of the collectors of these differential transistors then causes the gate 85 to partially block (or pass) the +Q phase signals for this transitional state of operation of the transistor 147.

The particular form of the gate 85 which has been chosen is selected merely for purposes of illustration, and other types and forms of gates could be employed so long as the operation of passing or blocking the +Q phase signals applied to the input of the gate is maintained in accordance with the discussion above for FIG. 5 and the previous discussion of FIG. 2.

The signal appearing on the junction 165 at the output at the gate 85 are applied through a coupling capacitor 166 to a resistor 167 comprising the primary component of an adder or matrix circuit 69. The +I phase signals appearing on the lead 133 also are applied to the opposite end of the resistor 167 and the tap thereon is adjusted to add the two signals together to supply the reconstructed chroma, comprising I and modified or unmodified Q components to a resistor 168. An adjustable tap on the resistor 168 is used to select the proper amplitude of the reconstructed or reconstituted chroma signal. This signal then is applied to an output terminal 170 which constitutes the input for the second chroma aplifier 87 shown in FIG. 2. It is apparent from the foregoing description that the signals appearing on the terminal 170 either comprise the full chroma signal components with all of the I and Q components, or I signal components only, or I signal components and reduced Q signal components in accordance with the operation of the gate 85.

The circuit which has been described is one which provides a maximum control or correction of signals at low saturation levels occurring around the flesh region (I axis) in hue, and leaves the remaining signals outside of the selected wedge or angle of control substantially unmodified. The circuit further minimizes modification of high saturation color signal components. As a consequence, the system produces the desired correction or stabilization of flesh tones without affecting the remaining colors reproduced by the television receiver in which it is used to any substantial degree.

It also should be noted that instead of employing the output of the comparator to open and close a gate for the Q signal components, the comparator output could be used to shift the phase of the reference oscillator relative to the burst component of the composite television input signal to effect the apparent shift of the Q components to the I axis. Using a bipolar analog control signal, such phase shifts of the oscillator signal applied to the receiver color demodulators could be made in either direction.

We claim:

1. In a color television receiver for receiving a composite signal comprising at least brightness signal components, a subcarrier signal component modulated in phase and amplitude to represent hue and saturation of a color image, and a burst component for phase locking the signal of an oscillator of the receiver to control color signal demodulators for the subscriber at different phases of the oscillator output signal, an automatic hue control circuit for controlling hue variations about a predetermined phase of said subcarrier signal component relative to the output signal of the oscillator, said automatic hue control circuit including in combination:

first circuit means responsive to at least the subcarrier component of said composite signal for providing a first demodulated signal at said predetermined phase and having a magnitude corresponding to the magnitude of signals at said predetermined phase;

second circuit means responsive to at least the subcarrier component of said composite signal for producing a first control voltage representative of the absolute magnitude of signals in quadrature with signals at said predetermined phase;

means for supplying said composite signal to said first and second circuit means;

comparator circuit means having first and second inputs and an output;

first coupling means connecting said second circuit means with said first input of said comparator circuit means for applying said first control voltage thereto;

second coupling means connecting said first circuit means with the second input of said comparator circuit means for applying a second control voltage thereto, said second control voltage having a magnitude which has a predetermined value relative to the magnitude of said first demodulated signal;

gating circuit means having a signal input, an output, and a control input and operative to pass signals from the input to the output thereof in response to the application of an enabling signal on the control input thereof;

means for applying said quadrature signals to the input of said gating circuit means;

means coupling the output of said comparator circuit means to the control input of said gating circuit means to apply an enabling signal thereto whenever said first control voltage is greater than said second control voltage; and means for utilizing the output of said gating circuit means to produce color signals for reproduction by said television receiver.

2. The combination according to claim 1 wherein said first circuit means includes means for limiting the magnitude of said first demodulated signal to a predetermined maximum value.

3. The combination according to claim 1 wherein said second circuit means produces said first control voltage representative of the absolute magnitude of demodulated signals in quadrature with said first demodulated signal and said means for applying said quadrature signals to the input of said gating circuit means comprises means for applying demodulated quadrature signals to such input, said combination further including third circuit means responsive to said composite signal for providing a signal representative of said brightness signal components at the output thereof and wherein said utilizing means is coupled to receive said signal representing said brightness signal components, said first demodulated signal and the output of said gating circuit means.

4. The combination according to claim 3 wherein the utilizing means comprises a matrix and said second coupling means comprises variable resistance means for enabling adjustment of the magnitude of said second control voltage.

5. An automatic hue control circuit for a color television receiver having a chrominance signal processing channel and in which the chrominance information signals applied thereto comprise a subcarrier signal modulated in phase and amplitude to represent hue and saturation of a color image, such hue and saturation being represented by signal components on first and second axes at quadrature with one another, said hue control circuit including in combination:

means for separating said chrominance information into components corresponding to signals on said first and second axis;

means coupled with said separating means for producing a first control signal representative of the absolute magnitude of said signals on said second axis;

means coupled with said separating means for producing a second control signal having a magnitude which has a predetermined value relative to the magnitude of said signals on said first axis;

a comparator having an output and first and second inputs connected to receive said first and second control signals, respectively, and producing an enabling signal on the output thereof whenever the magnitude of said first control signal is greater than the magnitude of said second control signal;

a gate having a signal input, an output, and a control input;

means for supplying said signal components on said second axis to the input of said gate;

means coupling the output of said comparator with the control input of said gate for enabling said gate to pass signals from the input to the output thereof in response to an enabling signal from said comparator; and means for combining the output of said gate and said signals on said first axis to form a hue corrected signal.

6. The combination according to claim 5 wherein said first and second axes correspond respectively to the I and Q chrominance axes.

7. The combination according to claim 6 wherein said television receiver further includes a chroma amplifier circuit and a reference oscillator circuit with said separating means coupled to receive chrominance signals from said chroma amplifier; and wherein said means for producing said second control signal includes first demodulating means responsive to signals at a particular phase from said reference oscillator and said signals on said I axis for providing a demodulated I color representative signal corresponding to said second control signal.

8. The combination according to claim 7 wherein said demodulating means is a limiting demodulator which limits the maximum amplitude of said demodulated I color representative signal.

9. The combination according to claim 7 further including coupling circuit means connecting said demodulating means with the second input of said comparator, said coupling circuit including means for applying a predetermined fraction of said demodulated I color representative signal to the second input of said comparator.

10. The combination according to claim 9 wherein said coupling circuit means includes a variable resistance means.

11. An automatic hue control circuit for a color television receiver having a chrominance signal processing channel and in which the chrominance information signals applied thereto comprise a subcarrier signal modulated in phase and amplitude to represent hue and saturation of a color image, such hue and saturation being represented by signal components on the first and second axes at quadrature with one another, said hue control circuit including in combination:

means for separating said chrominance information into components corresponding to signals on said first and second axes;

first means including peak detector means coupled with said separating means for producing a first control signal representative of the absolute magnitude of said signal on said second axis;

second means coupled with said separating means for producing a second control signal having a magnitude which has a predetermined value relative to the magnitude of said signal components on said first axis;

comparison circuit means having an output, and first and second inputs connected said first and second means to receive said first and second control signals, respectively, and producing an output signal on the output thereof indicative of the relative magnitudes of said first and second control signals; and means coupled with the output of said comparator circuit and responsive to said output signal for varying the hue of the color image reproduced by said color television receiver.

12. The combination according to claim 11 wherein the magnitude of said second control signal is limited to a predetermined maximum value.

13. The combination according to claim 12 wherein said second means includes a limiting demodulator, the maximum output of which is limited to a predetermined magnitude less than the maximum value which can be reached by signal components on said first axis.

* * * * *